(12) United States Patent
Neubrand et al.

(10) Patent No.: US 6,318,792 B1
(45) Date of Patent: Nov. 20, 2001

(54) ARTICULATED TONNEAU COVER

(75) Inventors: Frank G. Neubrand, Bloomfield; Siegbert Matter, Rochester, both of MI (US)

(73) Assignee: CTS Fahrzeug Dachsysteme GmbH, Rochester Hills, MI (US)

( * ) Notice: Subject to any disclaimer, the term of this patent is extended or adjusted under 35 U.S.C. 154(b) by 0 days.

(21) Appl. No.: 09/535,601

(22) Filed: Mar. 27, 2000

Related U.S. Application Data

(60) Provisional application No. 60/126,404, filed on Mar. 26, 1999.

(51) Int. Cl.⁷ .......................................................... B60J 7/20
(52) U.S. Cl. ..................................... 296/107.08; 296/136
(58) Field of Search ............................... 296/107.08, 136, 296/108, 117

(56) References Cited

U.S. PATENT DOCUMENTS

| | | |
|---|---|---|
| 2,992,042 | 7/1961 | Gilson et al. . |
| 4,799,729 | 1/1989 | Muscat . |
| 5,064,241 | 11/1991 | Ohrle . |
| 5,067,768 | 11/1991 | Fischbach . |
| 5,100,195 | 3/1992 | Patel . |
| 5,219,200 | 6/1993 | Orth et al. . |
| 5,322,337 | 6/1994 | Rawlings et al. . |
| 5,558,388 | 9/1996 | Furst et al. . |
| 5,593,202 | 1/1997 | Corder et al. . |
| 5,620,226 | 4/1997 | Sautter, Jr. . |
| 5,769,483 | 6/1998 | Danzl et al. . |
| 5,775,766 | 7/1998 | Schaible et al. . |
| 5,921,608 | * 7/1999 | Schmitt et al. .................. 296/136 X |
| 5,967,593 | * 7/1999 | Schuler et al. ....................... 296/136 |
| 6,039,382 | 3/2000 | Mather et al. . |

FOREIGN PATENT DOCUMENTS

| | | |
|---|---|---|
| 9200808.9 | 7/1992 | (DE) . |
| 19637005 | 12/1997 | (DE) . |

* cited by examiner

Primary Examiner—Joseph D. Pape
(74) Attorney, Agent, or Firm—Brooks & Kushman P.C.

(57) ABSTRACT

An articulated tonneau cover having a center panel and right and left corner panels that are pivotally connected to the center panel. Right and left corner panels are moved between an extended position in which the corner panels are adjacent to right and left edges of the center panel and a retracted position in which the right and left corner panels are inboard of the center panel. A motor drives the corner panels between their extended and retracted positions. Cam ramp pivots shift the corner panels vertically as they are pivoted relative to the center panel so that the corner panels are substantially coplanar with the center panel when they are in their extended position. When the corner panels are in their retracted position they are disposed below and parallel to the center panel. Side counter panels are provided forward of the corner panels and are moved in conjunction with the center panels by means of a cylinder and four bar link.

13 Claims, 3 Drawing Sheets

# US 6,318,792 B1

ARTICULATED TONNEAU COVER

This application claims benefit to Provisional application 06/126,404 filed Mar. 26, 1999.

TECHNICAL FIELD

The present invention relates to tonneau covers for convertible tops.

BACKGROUND ART

Vehicles having convertible tops are enjoying a substantial increase in popularity. The increase in popularity has been fostered by developments such as automatic convertible top extension and retraction and improvements in durability and appearance.

One type of automatic convertible top that is currently available is secured to the beltline of the vehicle at the rear edge of the convertible top and covered by a soft detachable tonneau cover, or "boot." Another type of automatic convertible top has a one piece hard tonneau cover that is provided with a bottom rear edge that is not attached to the vehicle but is instead attached to a movable bow that is pivoted to allow for opening and closing of the convertible top and hard tonneau cover.

Soft tonneau covers are inconvenient and time consuming to attach and detach. They are generally secured by snap fasteners around their entire parameter. In some cases it may be necessary to snap or unsnap twenty or more snap fasteners to attach or detach a soft tonneau cover. Faced with this inconvenience, many drivers elect to leave the soft tonneau cover in the trunk. If the soft tonneau cover is not attached, the vehicle is both less aerodynamic and less attractive.

One disadvantage associated with automatic convertible tops that are not secured on the lower edge to the vehicle permanently, or "stitched in," is that the rear edge of the convertible top may provide an additional air or water leakage path. This type of convertible top is also more noisy than a stitched in top. In addition, movement of the bow at the rear edge of the convertible top requires a complex mechanical mechanism that pivots the bow up and down to permit opening and closing of the one piece hard tonneau cover. The complexity of such structures adds to their cost and is a potential maintenance problem.

One objective in providing a hard tonneau cover is to provide a durable and strong cover that is capable of supporting at least 350 pounds. Another objective is to provide a hard tonneau cover that can be used to cover an automatic convertible top and its operating mechanism that has its rear edge stitched in or otherwise secured to the vehicle body permanently. Another objective is to reduce the complexity of the convertible top mechanism including the tonneau cover while providing completely automatic and reversible operation.

These and other problems presented by prior art devices and objectives in the design of hard tonneau covers are addressed by the present invention.

DISCLOSURE OF INVENTION

According to the present invention, a tonneau cover is provided that is formed of multiple panels that are connected together in an articulated arrangement so that portions of the tonneau cover may be retracted automatically as the top is raised and lowered.

According to the present invention, a tonneau cover for a vehicle is provided that includes a center panel. Right and left corner panels are connected to the center panel and are moveable between an extended position in which the corner panels are adjacent to right and left edges of the center panel and a retracted position in which the right and left corner panels are at least particularly inboard of the center panel. A drive system is provided for moving the corner panels between their extended and retracted positions.

According to another aspect of the invention, pivot connectors connect each of the right and left corner panels to the center panel. The pivot connectors are preferably cam ramp pivots that shift the corner panels vertically as they are pivoted. The corner panels are substantially coplanar with the center panel when the corner panels are in their extended position and are parallel to the center panel when the corner panels are in their retracted position.

The drive system is an electrical motor that is secured to the center panel and includes a rotary drive disk that is rotated by the motor through a gear reducer. A pair of links connect the drive disk to the corner panels with one link being connected to each of the corner panels.

According to another aspect of the invention, right and left side tonneau panels are provided adjacent to and forward of a front edge of the right and left corner panels when the corner panels are in their extended position. The side tonneau panels are connected in a four bar link arrangement with the center panel. The four bar link is connected to a bracket that is secured to the vehicle. A drive cylinder is operatively connected by the four bar link to pivot the center panel and the side panels upwardly to thereby provide clearance for raising and lowering a convertible top of the vehicle.

The above objects and advantages of the present invention will be better understood in view of the attached drawings and detailed description of the invention.

BEST MODE FOR CARRYING OUT THE INVENTION

Figure 1:
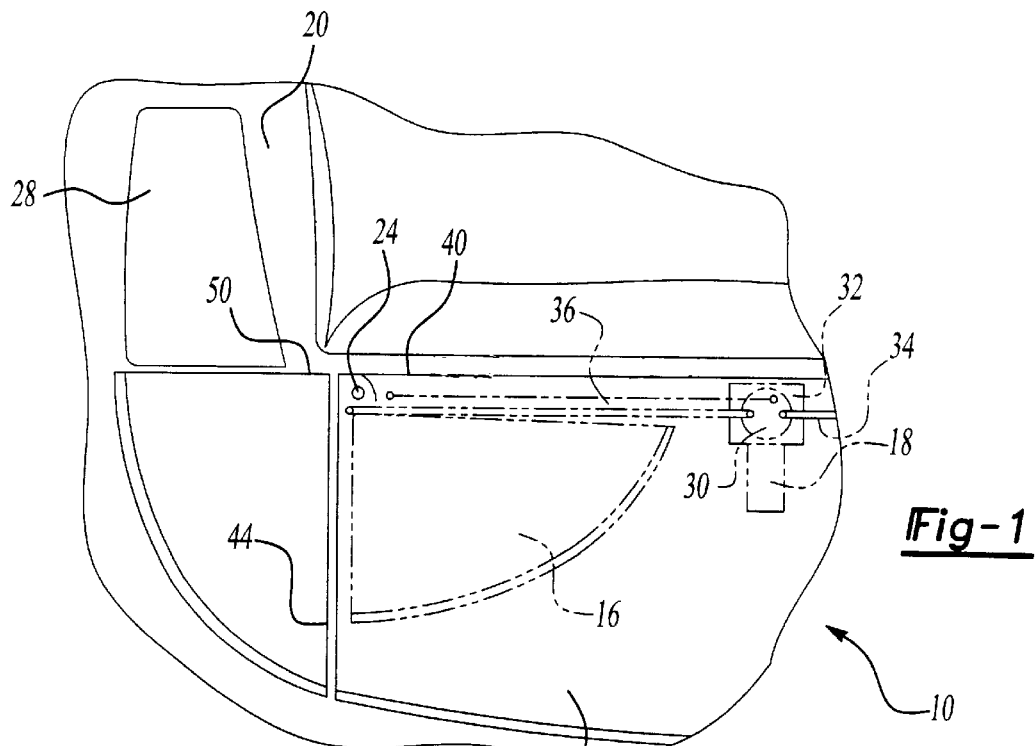
FIG. 1 is a fragmentary top plan view of the left half of an articulated tonneau cover made in accordance with the present invention.
Figure 2:
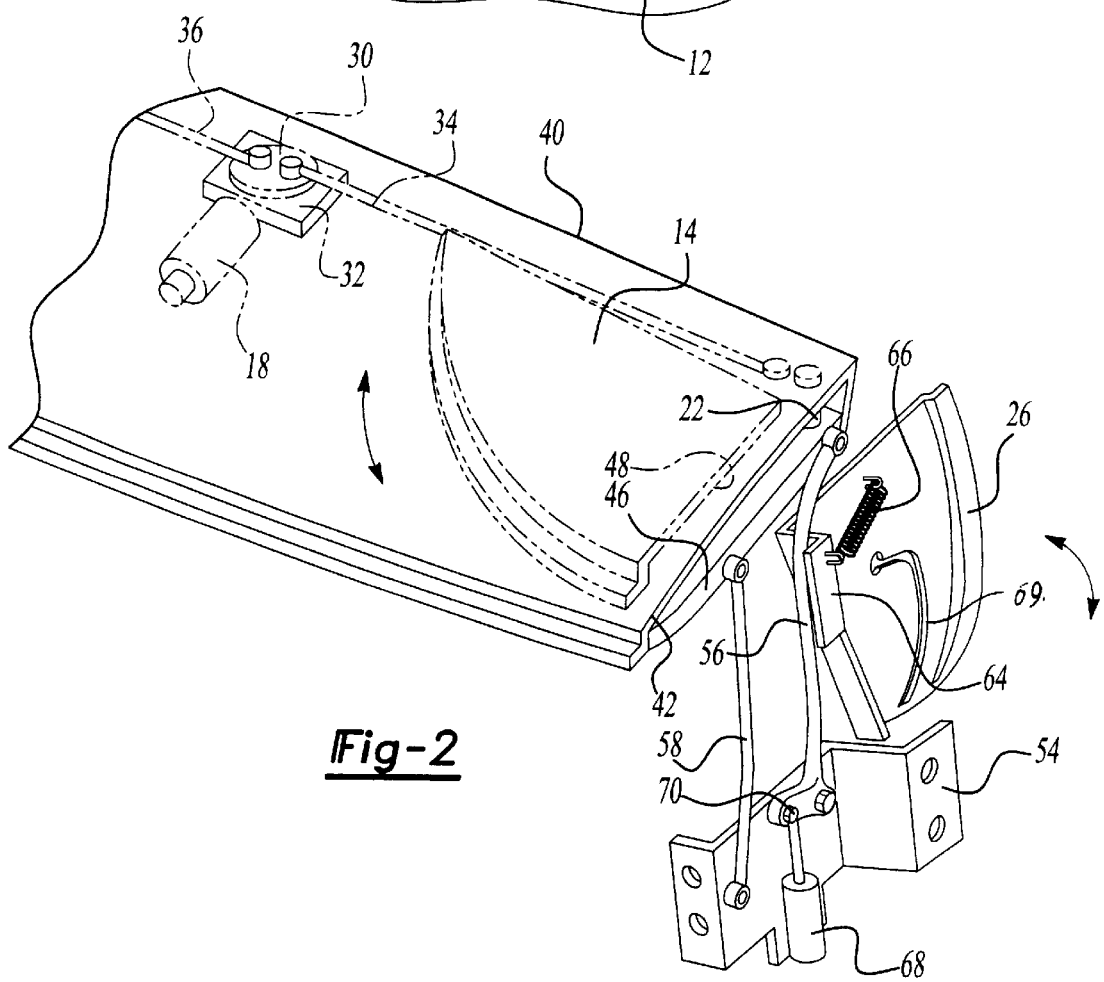
FIG. 2 is a fragmentary perspective view of the right side of the articulated tonneau cover.

Referring now to FIGS. 1 and 2, an articulated tonneau cover made in accordance with the present invention is generally indicated by reference numeral 10. A center panel 12 and right and left corner panels 14, 16 form the principal panels of the articulated tonneau cover 10. A drive motor 18 is used to extend and retract the right corner panel 14 and left corner panel 16 relative to the center panel 12. Referring to FIG. 1, left corner panel 16 is shown in solid lines in its extended position and is shown in phantom in its retracted position. The tonneau cover 10 is connected to a vehicle 20. In FIG. 2, the right corner panel 14 is shown in its retracted position.

Right and left corner panels 14, 16 are connected to the center panel 12 by means of right and left pivot cam ramps 22, 24, respectively. Right and left corner panels 14, 16 pivot on the pivot cam ramps 22, 24 as they are moved between the extended and retracted position. The pivot cam ramps 22, 24 also include a track for guiding movement of the corner panels 14, 16 at the end of the extension cycle so that the corner panels 14, 16 are moved to a position wherein they are coplanar with the center panel 12. At the beginning of the retraction cycle the corner panels 14, 16 are lowered by the pivot cam ramps 22, 24 so that they can be moved under the center panel 12 as they are retracted.

Figure 4:
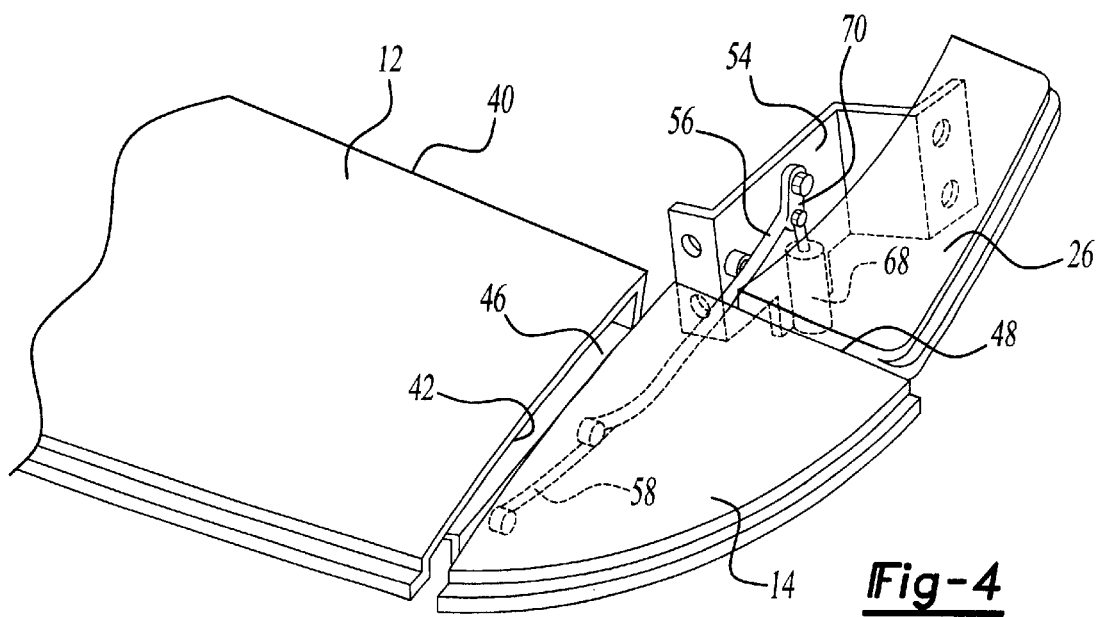
FIG. 4 is a fragmentary perspective view of the right side of the articulated tonneau cover.
Figure 5:
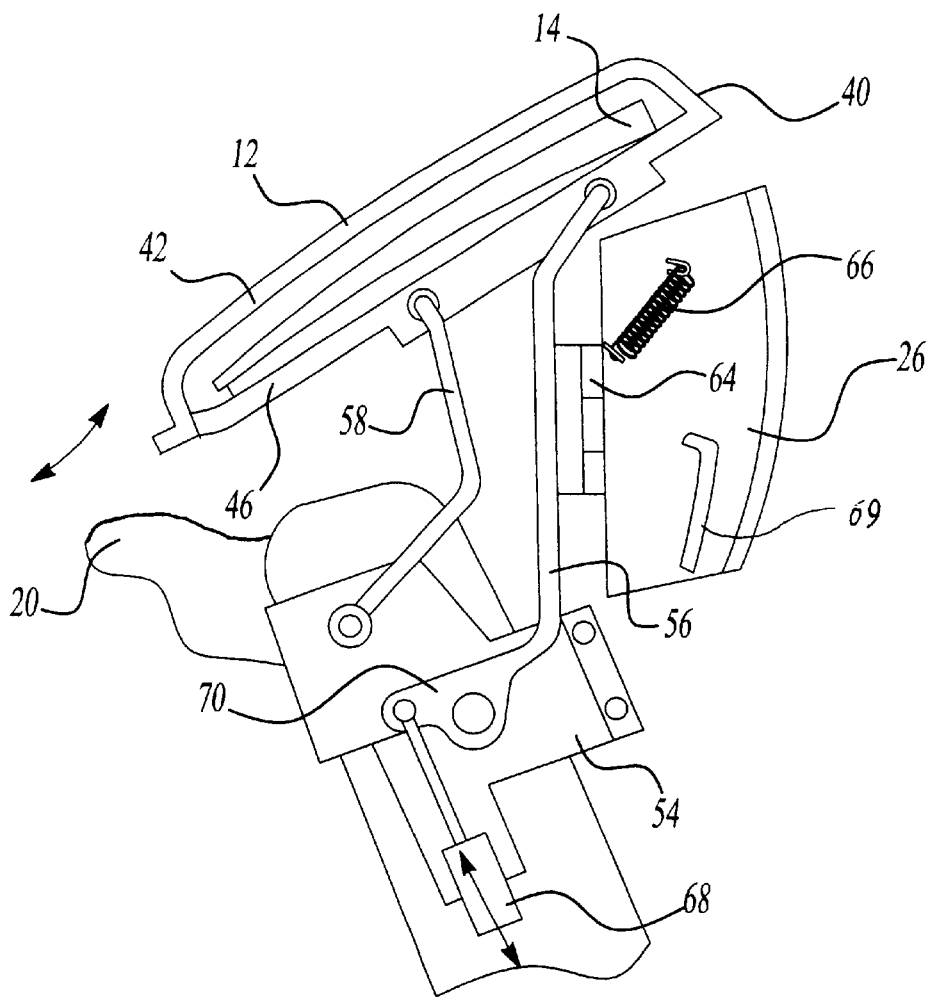
FIG. 5 is a side elevation view showing the articulated tonneau cover in its raised position.

As shown in FIGS. 2, 4 and 5, a right side panel 26 is provided forward of the right corner panel 14. Left side panel 28 is shown as it would appear when the tonneau cover is covering the well in which a convertible top is stored when the top is in its down position.

Referring to FIGS. 1 and 2, a rotary disk 30 and gear reducer 32 are driven by drive motor 18 to extend and retract the right and left corner panels 14, 16. A right link 34 connects the rotary disk 30 to the right corner panel 14. Similarly, left link 36 connects rotary disk 30 to left corner panel 16. The output shaft of drive motor 18 rotates at a relatively high speed. Gear reducer 32 takes the rotational output of the drive motor 18 and causes the rotary disk 30 to rotate at an appropriate speed to extend and retract the corner panels 14, 16.

The center panel 12 has a front edge 40 that is located on the vehicle 20 at a point behind the rearmost vehicle seats. The center panel 12 includes a right edge 42 and a left edge 44. Right and left corner panels 14 and 16 are located adjacent the right and left edges 42 and 44 respectively. The center panel 12 includes a base plate 46 that reinforces the center panel 12. The space between the base plate 46 and the center panel 12 defines a pocket for receiving the right and left corner panels 14,16. Right corner panel 14 is shown in FIG. 2 with front edge 48 oriented toward the side of a vehicle. This occurs when the right corner panel 14 is in its retracted position. When right corner panel 14 is rotated to its extended position the front edge 48 faces toward the front of the vehicle. Left corner panel 16 is shown in FIG. 1 in its extended position with the front edge 50 facing the front end of the vehicle.

Referring to FIGS. 2, 4 and 5, the four bar link is illustrated that is used to raise and lower the center panel 12 and the side panels 26, 28. A bracket 54 is adapted to be secured to vehicle with conventional fasteners. A drive link 56 is connected to the bracket 54 and the base plate 46. A balance link 58 is connected between the bracket 54 and the base plate 46. The four bar link is provided by the drive link 56, balance link 58, bracket 54 and base plate 46. The right side panel 26 is connected by a hinge 64 to the drive link 56 and is biased by spring 66 into its closed position (corresponding to the position of left side panel 28 in FIG. 1). A cylinder 68 powers the movement of the center panel 12 and also provides the power mechanism for pivoting the right side panel 26 that moves in conjunction with the opening and closing center panel 12. Right and left side panels 26, 28 each have a cam arm 69 that engages a surface on the vehicle. The spring 66 holds the cam slot 69 against the vehicle surface during rotation around the hinge 64. Cylinder 68 is connected to the drive link 56 by an arm 70 that is generally perpendicular to the length of the drive link 56.

Figure 3:
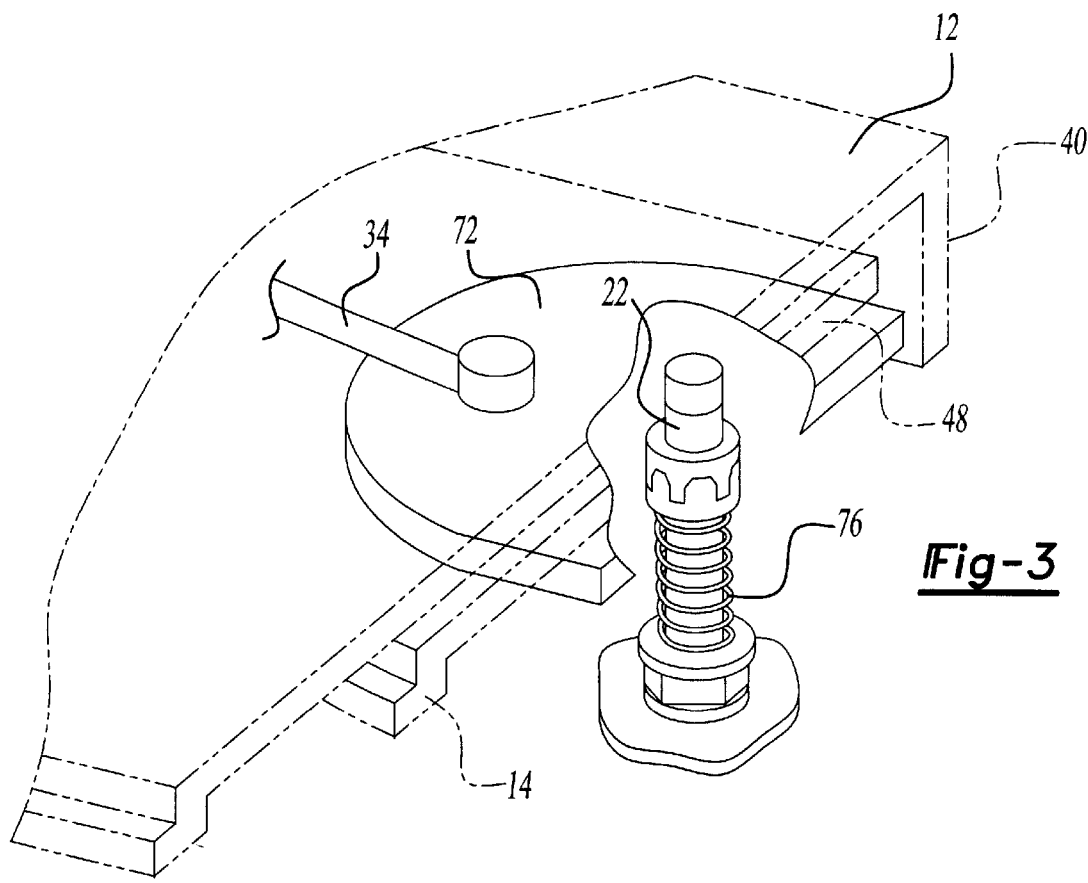
FIG. 3 is a fragmentary perspective view of a cam ramp pivot used to guide the movement of a corner panel of the articulated tonneau cover as it is moved between its extended and retracted positions.

Referring now to FIG. 3, the right pivot cam ramp 22 is shown as it attached to the center panel 12 and right corner panel 14. A plate 72 is provided to reinforce the center panel where it connects to the pivot cam ramp 22 and also provide a reinforced mounting surface for right link 34. A corresponding plate is also provided on the left side of the center panel 12 but is not shown. A spring 76 biases the pivot cam ramp 22 into its raised position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tonneau cover for a vehicle comprising:
   a center panel having right and left edges;
   right and left corner panels are each connected by a pivot connector to the center panel and moveable between an extended position in which the corner panels are adjacent to right and left edges of the center panel and a retracted position in which the right and left corner panels are at least partially inboard of the center panel, wherein the pivot connectors are cam ramp pivots that shift the corner panels vertically as they are pivoted wherein the corner panels are substantially coplanar with the center panel when in the extended position and are parallel to the center panel when in the retracted position; and
   a drive system for moving the corner panels between the extended and retracted positions.

2. A tonneau cover for a vehicle comprising:
   a center panel having right and left edges;
   right and left corner panels connected to the center panel and moveable between an extended position in which the corner panels are adjacent to right and left edges of the center panel and a retracted position in which the right and left corner panels are at least partially inboard of the center panel; and
   a drive system for moving the corner panels between the extended and retracted positions the drive system is an electrical motor that is secured to the center panel and includes a rotary drive disk that is rotated by the motor, a pair of links connect the drive disk to the corner panels with one link being connected to each of the corner panels.

3. A tonneau cover for a vehicle comprising:
   a center panel having right and left edges;
   right and left corner panels connected to the center panel and moveable between an extended position in which the corner panels are adjacent to right and left edges of the center panel and a retracted position in which the right and left corner panels are at least partially inboard of the center panel;
   right and left side tonneau panels are provided adjacent to and forward of a front edge of the right and left corner panels when the corner panels are in the extended position a drive system for moving the corner panels between the extended and retracted positions; and
   a drive system for moving the corner panels between the extended and retracted positions.

4. The tonneau cover of claim 3 wherein the side tonneau panels are connected by a four bar link to the center panel, the four bar link is connected to a bracket that is secured to the vehicle, a drive cylinder operatively connects the four bar link, center panel and the side panels to pivot the center panel upwardly and pivot the side panels upwardly.

5. A tonneau cover for a vehicle having a convertible top that may be raised and lowered, the tonneau cover being formed from a rigid panel, the improvement comprising:

the rigid panel being formed by a center panel and right and left corner panels that are connected to the center panel and are moveable between an extended position in which the corner panels are adjacent to the center panel and a retracted position in which the right and left corner panels are at least partially inboard of the center panel;

a connector connects each of the right and left corner panels to the center panel, the connectors shift the corner panels vertically as they are moved wherein the corner panels are substantially coplanar with the center panel when in the extended position and are parallel to the center panel when in the retracted position; and a drive system for moving the corner panels between the extended and retracted positions.

6. The tonneau cover of claim 5 wherein the drive system is an electrical motor that is secured to the center panel and includes a rotary drive disk that is rotated by the motor through a gear reducer, a pair of links connect the drive disk to the corner panels with one link being connected to each of the corner panels.

7. The tonneau cover of claim 5 wherein right and left side tonneau panels are provided adjacent to and forward of a front edge of the right and left corner panels when the corner panels are in the extended position.

8. The tonneau cover of claim 7 wherein the side tonneau panels are connected by a four bar link to the center panel that is connected by a hinge at a front edge to the vehicle, the four bar link is connected to a bracket that is secured to the vehicle, a drive cylinder operatively connects the four bar link, center panel and the side panels to pivot the center panel upwardly and pivot the side panels upwardly.

9. A tonneau cover for a vehicle having a convertible top comprising:
   a center panel;
   right and left side panels connected by a four bar link to the center panel that is connected by a hinge at a front edge to the vehicle, the four bar link is connected to a bracket that is secured to the vehicle, a linear actuator operatively connects the four bar link, center panel and the side panels to pivot the center panel upwardly and pivot the side panels upwardly as the convertible top is raised and lowered, the center panel and side panels forming a cover over the convertible top when stored.

10. The tonneau cover of claim 9 wherein the center panel has right and left edges;
    right and left corner panels are connected to the center panel and moveable between an extended position in which the corner panels are adjacent to right and left edges of the center panel and a retracted position in which the right and left corner panels are at least partially inboard of the center panel.

11. The tonneau cover of claim 10 wherein a pivot connector connects each of the right and left corner panels to the center panel, the pivot connectors are cam ramp pivots that shift the corner panels vertically as they are pivoted wherein the corner panels are substantially coplanar with the center panel when in the extended position and are parallel to the center panel when in the retracted position.

12. The tonneau cover of claim 10 further comprising a drive system having an electrical motor that is secured to the center panel and includes a rotary drive disk that is rotated by the motor through a gear reducer, a pair of links connect the drive disk to the corner panels with one link being connected to each of the corner panels.

13. A tonneau cover for a vehicle having a convertible top that may be raised and lowered, the tonneau cover being formed from a rigid panel, the improvement comprising:
    the rigid panel being formed by a center panel and right and left corner panels that are connected to the center panel and are moveable between an extended position in which the corner panels are adjacent to the center panel and a retracted position in which the right and left corner panels are at least partially inboard of the center panel; and
    a drive system for moving the corner panels between the extended and retracted positions, wherein the drive system is a motor that is secured to the center panel and includes a drive that is rotated by the motor through a gear reducer, a pair of links connect the drive to the corner panels with one link being connected to each of the corner panels.

* * * * *